US005596624A

United States Patent [19]
Armbruster et al.

[11] Patent Number: 5,596,624
[45] Date of Patent: Jan. 21, 1997

[54] METHOD AND APPARATUS FOR PROVIDING INCREASED ACCESS TO A LOCAL COMMUNICATION NETWORK

[75] Inventors: Peter J. Armbruster; James W. Bishop, Jr., both of Chandler, Ariz.

[73] Assignee: Motorola, Inc., Schaumburg, Ill.

[21] Appl. No.: 312,364

[22] Filed: Sep. 26, 1994

[51] Int. Cl.⁶ ............................ H04Q 7/38; H04Q 7/24
[52] U.S. Cl. ........................ 379/58; 379/59; 379/219
[58] Field of Search ................... 340/33.1; 370/94.1, 370/60, 95.3; 379/58, 59, 67, 219, 60; 455/33.1, 33.2, 33.4, 54.1, 12.1, 13.1

[56] References Cited

U.S. PATENT DOCUMENTS

| | | |
|---|---|---|
| 4,689,815 | 8/1987 | Grewal et al. . |
| 4,694,487 | 9/1987 | Chang et al. . |
| 5,010,317 | 4/1991 | Schwendeman et al. ............. 340/31.1 |
| 5,119,366 | 6/1992 | Ardon et al. . |
| 5,179,721 | 1/1993 | Comroe et al. . |
| 5,195,090 | 3/1993 | Bolliger et al. ..................... 370/94.1 |
| 5,345,498 | 9/1994 | Mauger et al. ........................ 379/58 |
| 5,384,831 | 1/1995 | Creswell et al. ..................... 379/67 |
| 5,440,626 | 8/1995 | Boyle et al. ........................ 379/219 |
| 5,448,623 | 9/1995 | Wiedeman et al. ..................... 379/59 |

OTHER PUBLICATIONS

Del Re, "An Integrated Satellite Cellular Land Mobile System for Europe", date Sep. 1989.
America Online, "Satellite Systems" date Jun. 1995.
America Online, "Odyssey Satellite-Based Worldwide Wireless Telephone System" date May 1995.

Primary Examiner—William Cumming
Attorney, Agent, or Firm—Gregory J. Gorrie

[57] ABSTRACT

A local exchange with limited access to outside communication systems is coupled to a global satellite communication system by a mobile exchange unit. The mobile exchange unit (MXU) provides access to the local exchange by relating one channel in the global communication system to many possible destinations in the local exchange. Multiple circuits of the local exchange are associated with a single mobile number. A gateway associated with the MXU associates an available radio channel with the calling subscriber. Multi-stage dialing is eliminated and a subscriber can directly dial a number of a party in the local exchange.

18 Claims, 5 Drawing Sheets

5,596,624

METHOD AND APPARATUS FOR PROVIDING INCREASED ACCESS TO A LOCAL COMMUNICATION NETWORK

TECHNICAL FIELD OF THE INVENTION

The present invention relates generally to cellular communication systems. More specifically, the present invention relates to cellular communication systems that support multiple users through single communication channels.

BACKGROUND OF THE INVENTION

Many locations have substantial fixed telephone networks, which are not connected or are poorly connected with other telephone networks. As the coverage of cellular radio telephone systems grows, an opportunity arises to connect these isolated networks to other networks by the radio-telephone access service provided by cellular systems. Both large-scale and small-scale instances of the need for this exist.

A factory in a rural area, for example, which has a telephone network to facilitate communication among its employees, needs to be connected to a public telephone network. In certain areas, the cost of wired facilities to connect this factory to a switching center may be quite large. When a cellular system covers this factory, it may be less expensive to connect the factory's network to the public network by this cellular system.

As a larger example, consider an entire city in a remote part of the world. Wiring that city to the national or international network may be far more expensive than connecting it by a cellular communication system. A system that provides ubiquitous coverage using satellites which project radio coverage patterns onto the earth's surface, can be used to provide this connectivity.

In existing cellular systems, mobile radio-telephone sets (subscriber units) and related accessories have been manufactured which allow single fixed telephone sets to connect to a cellular network. Private telephone networks have allowed access to their service from other networks, and access to other networks from within. Multi-stage dialing procedures avoid having many accesses between the networks as are on either side of the boundary between them.

In existing cellular networks which use the "Global System for Mobile Communications" standards (referred to herein as GSM) for subscriber control and network behavior, no provision has been made to allow isolated networks supporting more than one fixed telephone set to access a communication network using procedures for efficient resource utilization. Further, no provision has been made to do this without using multi-stage dialing procedures. These isolated networks are generally so large that to allocate a radio access resource dedicated to each fixed telephone set would be economically and physically prohibitive.

Thus what is needed are a method and apparatus that have the characteristic that radio access resources are utilized as efficiently as possible. Moreover, what is also needed are a method and apparatus that avoids multi-stage dialing procedures and allows directory numbers of telephone sets in an isolated network to be called directly by callers in other networks.

What is also needed are a method and apparatus for providing a voice connection between a satellite communication system and networks in areas of the world that cannot support a full gateway due to poor infrastructure, lack of international switching center (ISC) interconnection and financial considerations. What is also needed are a method and apparatus for associating multiple circuits to a single mobile number within a mobile environment. What is also needed is a signaling algorithm for communication with a mobile exchange unit that associates multiple circuits to a single mobile number within a mobile environment.

DETAILED DESCRIPTION OF THE DRAWINGS

The present invention provides, among other things, a method and apparatus of coupling a local exchange that may have limited access to outside communication systems with a global communication system. A mobile exchange unit (MXU) provides, among other things, access to the local exchange by relating one channel in the global communication system to many possible destinations in the local exchange. Multiple circuits of the local exchange are associated with a single mobile number. A gateway associated with the MXU associates an available radio channel with a calling subscriber. Multi-stage dialing is eliminated such that a subscriber can directly dial a number of a telephone set in the local exchange.

The term call as used herein, is not limited to telephone calls, but refers to any type of communication between communication devices. A "satellite" is defined herein to mean a man-made object or vehicle intended to orbit earth and includes both geostationary and orbiting satellites and/or combinations thereof including low earth orbiting (LEO) satellites. A "constellation" is defined herein to mean an ensemble of satellites arranged in orbits for providing specified coverage (e.g., radio communication) of portion(s) or all of earth. A constellation typically includes multiple rings (or planes) of satellites and may have equal numbers of satellites in each plane, although this is not essential. As used herein the terms "cell" and "antenna pattern" are not intended to be limited to any particular mode of generation and include those created by either terrestrial or satellite cellular communications systems and/or combinations thereof. The present invention is applicable to systems including satellites having low-earth, medium-earth and geo-synchronous orbits. Additionally, it is applicable to orbits having any angle of inclination (e.g., polar, equatorial or other orbital pattern).

Figure 1:
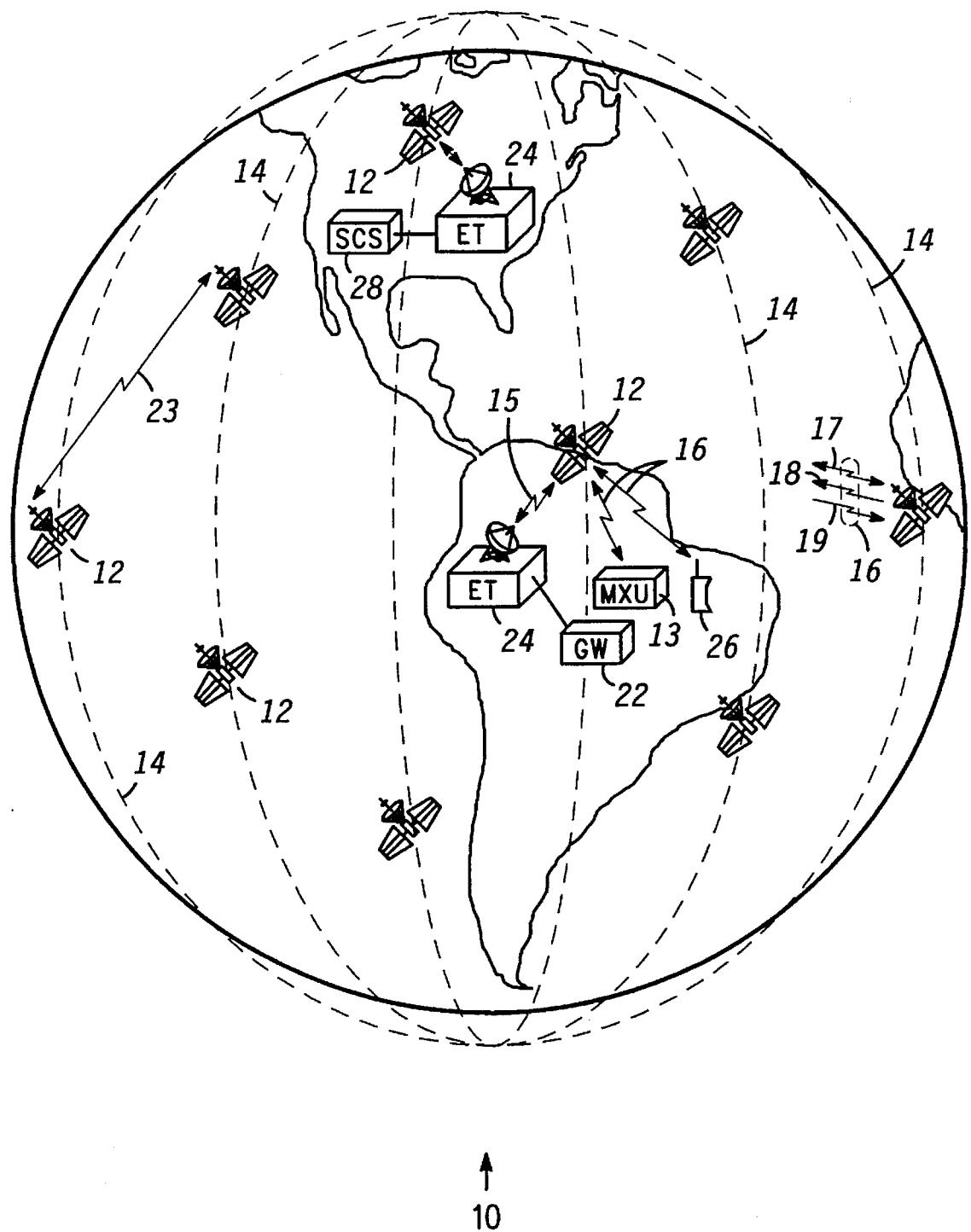
FIG. 1 illustrates a highly simplified diagram of a satellite-based communication system with which the present invention may be practiced.

FIG. 1 illustrates a highly simplified diagram of a satellite-based communication system with which the present invention may be practiced. Communication system 10 uses six polar orbits 14, with each orbit 14 holding eleven satellites 12 for a total of sixty-six satellites 12. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few of satellites 12.

In a preferred embodiment, each orbit 14 encircles earth at an altitude of around 780 km, although higher or lower orbital altitudes may be usefully employed. Due to the relatively low orbits of satellites 12, substantially line-of-sight electromagnetic (e.g., radio, light etc.) transmission from any one satellite or reception of signals by any one satellite involves or covers a relatively small area of earth at any instant.

For the example shown, satellites 12 travel with respect to earth at around 25,000 km/hr, allowing satellite 12 to be visible to a terrestrial station for a maximum period of approximately nine minutes.

Satellites 12 communicate with terrestrial stations which may include some number of radio communication subscriber units (SUs) 26 and earth terminals (ETs) 24 connected to system control segment (SCS) 28. ETs 24 may also be connected to or be include within gateways (GWs) 22, which provide access to a public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to calls in progress).

SUs 26 may be located anywhere on the surface of the earth or in the atmosphere above the earth. SUs 26 are preferably communications devices capable of transmitting data to and receiving data from satellites 12. By way of example, SUs 26 may be a hand-held, portable cellular telephones adapted to communicate with satellites 12. Ordinarily, SUs 26 need not perform any control functions for communication system 10.

System 10 may accommodate any number, potentially in the millions, of subscriber units 26. In the preferred embodiments of the present invention, subscriber units 26 communicate with nearby satellites 12 by subscriber links 16. Links 16 encompass a limited portion of the electromagnetic spectrum that is divided into numerous channels. Links 16 are preferably combinations of L-Band frequency channels and may encompass Frequency Division Multiplex Access (FDMA) and/or Time Division Multiple Access (TDMA) communications (infra) or combination thereof. As a minimum, a satellite 12 continuously transmits over one or more broadcast channels 18. Subscriber units 26 synchronize to broadcast channels 18 and monitor broadcast channels 18 to detect data messages which may be addressed to them. Subscriber units 26 may transmit messages to satellites 12 over one or more acquisition channels 19. Broadcast channels 18 and acquisition channels 19 are not dedicated to any one subscriber unit 26 but are shared by all subscriber units 26 currently within view of a satellite 12.

On the other hand, traffic channels 17 are two-way channels that are assigned to particular subscriber units 26 by satellites 12 from time to time. In the preferred embodiments of the present invention, a digital format is used to communicate data over channels 17–19, and traffic channels 17 support real-time communications. At least one traffic channel 17 is assigned for each call, and each traffic channel 17 has sufficient bandwidth to support, as a minimum, a two-way voice conversation. To support real-time communications, a TDMA scheme is desirably used to divide time into frames, preferably in the 60–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a like number of independent calls.

Satellites 12 communicate with other nearby satellites 12 through cross links 23. Thus, a communication from a subscriber unit 26 located at any point on or near the surface of the earth may be routed through the constellation of satellites 12 to within range of substantially any other point on the surface of the earth. A communication path may be routed down to a subscriber unit 26 on or near the surface of the earth from a satellite 12 using a subscriber link 16. Alternatively, a communication may be routed down to or up from any of many ETs 24, of which FIG. 1 shows only two, through earth links 15. ETs 24 are preferably distributed over the surface of the earth in accordance with geo-political boundaries. In the preferred embodiments, each satellite 12 may communicate with up to four ETs 24 and over a thousand subscriber units 26 at any given instant.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22.

Communication system 10 also provides communication access to a local exchange through mobile exchange unit (MXU) 13. MXU 13 is linked with satellites 12 of communication system 10 by links 16. MXU 13 may be viewed from communication system 10 as one or more SUs 26 at a fixed location. MXU 13 is connected to a local exchange (not shown).

With the example constellation of sixty-six satellites 12, at least one of satellites 12 is within view of each point on earth's surface at all times (i.e., full coverage of the earth's surface is obtained). Theoretically, any satellite 12 may be in direct or indirect data communication with any SU 26 or ET 24 at any time by routing data through the constellation of satellites 12. Accordingly, communication system 10 may establish a communication path for relaying data through the constellation of satellites 12 between any two SUs 26, between SCS 28 and GW 22, between any two GWs 22 or between SU 26 and GW 22. In addition, communication system 10 may establish a communication path for relaying data between SU 26 or GW 22 and a telephone set in a local exchange associated with MXU 13.

Figure 2:
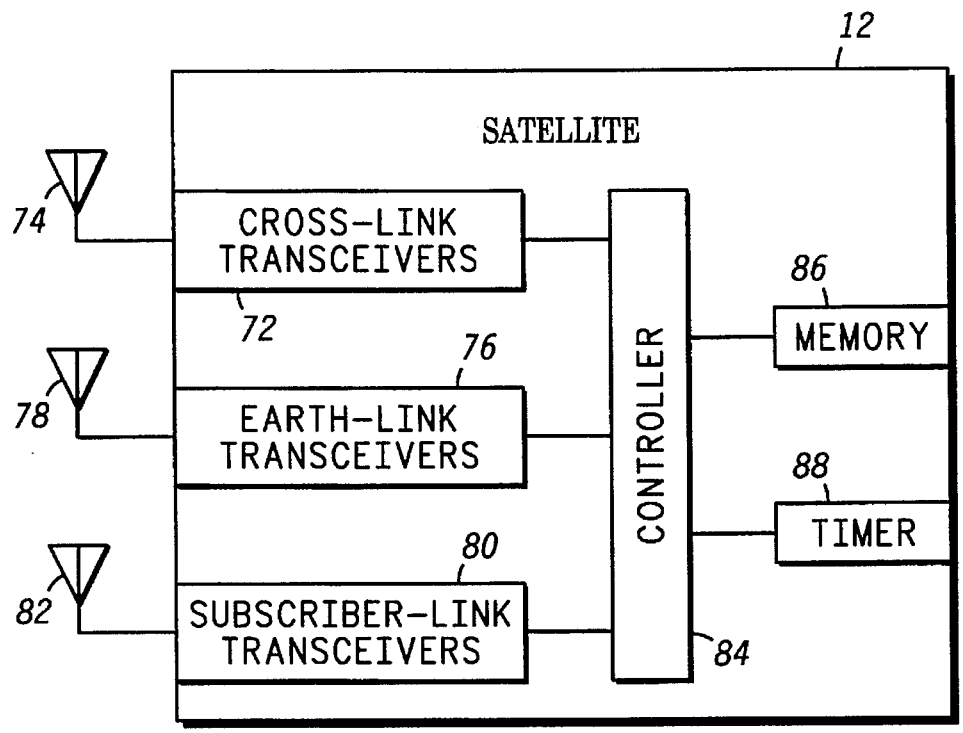
FIG. 2 illustrates a simplified block diagram of a satellite radio communication station suitable for use in a preferred embodiment of the present invention.

FIG. 2 illustrates a simplified block diagram of a satellite radio communication station suitable for use in a preferred embodiment of the present invention. Preferably, all satellites 12 within system 10 (see FIG. 1) include equipment as illustrated by the block diagram of FIG. 3. Satellite 12 includes cross-link transceivers 72 and associated antennas 74. Transceivers 72 and antennas 74 support cross-links to other nearby satellites 12. Earth-link transceivers 76 and associated antennas 78 support earth-links to communicate with earth terminals 24 (FIG. 1). Subscriber-link transceivers 80 and associated antennas 82 support subscriber units 26 (FIG. 1). Preferably, each satellite 12 may simultaneously support a link for up to several thousand or more of subscriber units 26 (FIG. 1). Of course, those skilled in the art will appreciate that antennas 74, 78, and 82 may be implemented either as single multi-directional antennas or as banks of discrete antennas. It is desirable that each subscriber-link antenna 82 be a phased array antenna capable of accessing many cells simultaneously.

A controller 84 couples each of transceivers 72, 76, and 80 as well as to a memory 86 and a timer 88. Controller 84 may be implemented using one or more processors. Controller 84 includes processors and uses timer 88 to maintain, among other things, the current date and time. Memory 86 stores data that serve as instructions to controller 84 and that, when executed by controller 84, cause satellite 12 to carry out procedures which are discussed below. In addition, memory 86 includes variables, tables, and databases that are manipulated during the operation of satellite 12.

Subscriber-link transceivers 80 are desirably multi-channel FDMA/TDMA transceivers capable of transmitting and receiving on all different selectable frequencies during particular, selectable, time-slots as directed by controller 84. Subscriber-link transceivers 80 contain multi-channel radios having sufficient number of channels to provide the desired number of transmission and reception frequencies for signal access and control and for the user voice and/or data. Controller 84 may provide for allocation of the frequency and time-slot assignments, cell-to-cell hand-off and other overhead and management and control functions. Subscriber-link transceivers 80 desirably provide for transmission and reception on any frequency channel set so that each subscriber unit transceiver 80 may, when needed, utilize the entire spectral capacity of all frequency channel sets by having the capability to handle all frequency and time-slot assignments.

Figure 3:
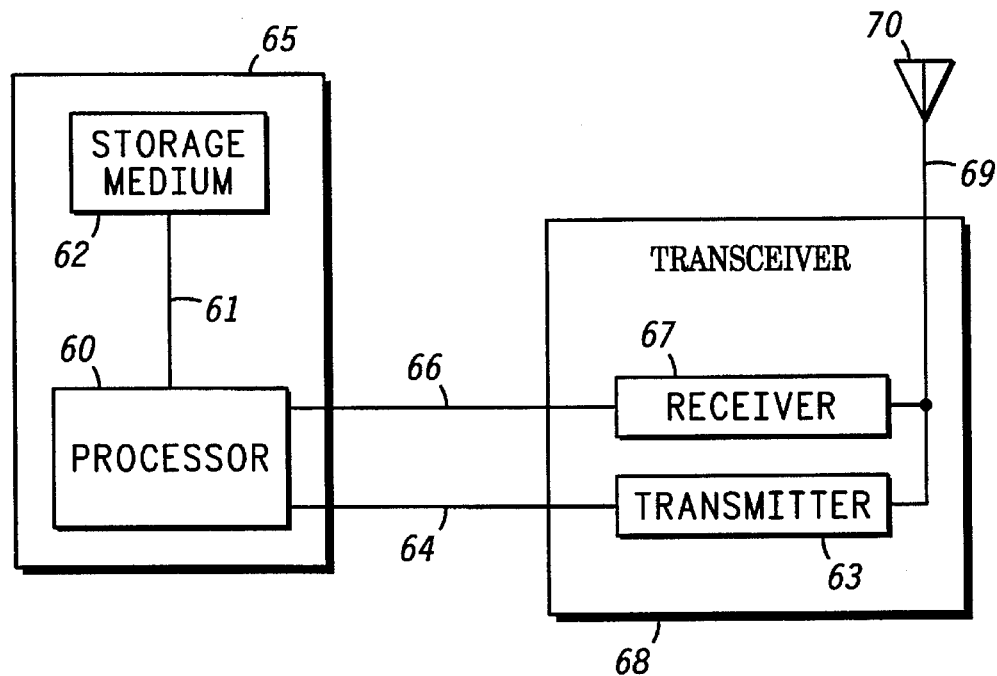
FIG. 3 illustrates a simplified block diagram of a system control station and an earth terminal suitable for use in a preferred embodiment of the present invention.

FIG. 3 illustrates a simplified block diagram of a system control station and an earth terminal suitable for use in a preferred embodiment of the present invention. Control station 65 and terrestrial station 68 are desirably part of SCS 28 (FIG. 1) and ET 24 (FIG. 1) respectively. Control station 65 and terrestrial station 68 may also be part of GW 22. Control station 65 comprises processor 60 coupled to associated storage medium 62 (e.g., random access memory or RAM, other semiconductor or magnetic read-write memory devices, optical disk, magnetic tape, floppy disk, hard disk etc.) by link 61. Terrestrial station 68 includes antenna 70 coupled to transmitter 63 and receiver 67 by link 69. Transmitter 63 and receiver 67 are coupled to processor 60 by links 64 and 66, respectively. Processor 60 desirably carries out procedures exemplified below and described in the associated text. For example, in addition to performing other tasks as appropriate, processor 60 desirably stores results from such procedures in storage medium 62. Transmitter 63 and/or receiver 67 transmit messages to and/or receive messages from satellites 12.

Processor 60 controls and manages user access, message reception and transmission, channel setup, radio tuning, frequency and time-slot assignment, and other cellular radio communication and control functions not managed or provided for by controller 84 (FIG. 2). Among other things, processor 60 and/or controller 84 (FIG. 2) desirably executes procedures to allow user access to communication system 10. This may include procedures for protocols for channel setup and other associated functions as discussed below.

Figure 4:
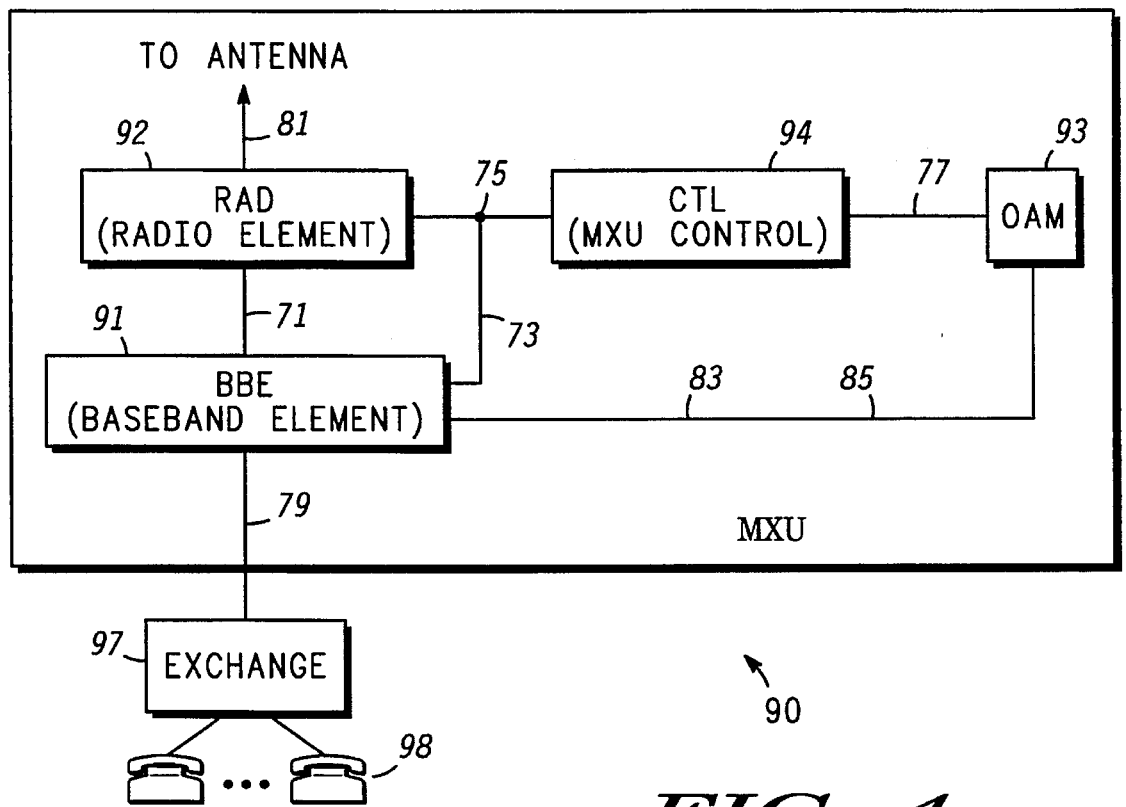
FIG. 4 illustrates a functional block diagram of a mobile exchange unit suitable for use in a preferred embodiment of the present invention.

FIG. 4 illustrates a functional block diagram of mobile exchange unit (MXU) 13 suitable for use in a preferred embodiment of the present invention. Baseband Element (BBE) 91 converts between cellular system and exchange voice traffic and signaling. Radio (RAD) 92 includes multi-channel transceivers which transmit and receive voice channel baseband information. MXU Control (CTL) 94 manages all communication activity in real time.

BBE 91 functions comprise error correction, voice coding/conversion, echo cancellation, buffering, cellular system and exchange signaling, supervision, and call management. BBE 91 desirably supports the layer one and two protocols. CTL 94 provides the call setup and tear-down sequencing and management/procedures of RAD 92 and BBE 91 resources. CTL 94 is responsible for layer three and application protocols; call control, mobility management, and radio resource management. Call activity is monitored and controlled by interfaces 73 and 75.

RAD 92 is also responsible for time and frequency accuracy, modulation and demodulation, frequency conversion, amplification, and the radiation and reception patterns. RAD 92 couples to BBE 91 by interface 71 and to satellite 12 (FIG. 1) by interface 81. RAD 92 is controlled by the MXU Control (CTL) by interface 75.

Operation, administration, maintenance element (OAM) 93 maintains the status, configuration, testing, and the man-machine interface of MXU 13. Configuration and testing of the BBE is performed by OAM 93 over interface 85. Configuration and testing of BBE 91 is performed by OAM 93 over interface 85. OAM 93 interfaces with CTL 94 over interface 77.

CTL 94 supports layer three and application protocols. Baseband traffic to/from communication system 10 (FIG. 1) is passed between BBE 91 and RAD 92 by interface 71, while traffic from local exchange 97 is passed over interface 79. Operations, administration, and maintenance traffic between OAM 93 and an administrator is passed over interface 83. Interfaces 79 and 83 preferably include various trunk and line types. BBE 91 is controlled by CTL 94 by interface 73.

Figure 5:
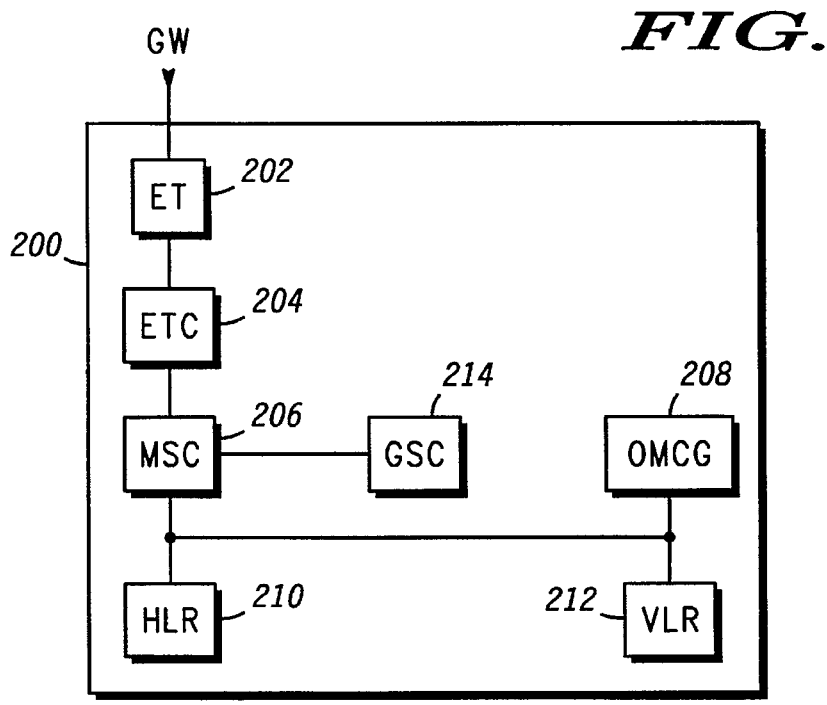
FIG. 5 illustrates a functional block diagram of a gateway suitable for use in a preferred embodiment of the present invention.

FIG. 5 illustrates a functional block diagram of gateway 22 suitable for use in a preferred embodiment of the present invention. Gateway 22 desirably includes earth terminal (ET) 202 which is similar to ET 24 (FIG. 1). Earth terminal 202 provides an RF interface to communication satellites 12 (FIG. 1) which provide radio coverage for subscriber units 26 as discussed above.

Gateway 22 also includes earth terminal controller (ETC) 204 which interfaces mobile switching center (MSC) 206 to satellites 12 (FIG. 1). ETC 204 provides functions not supported by MSC 206 including provides a logical interface between subscriber units and MSC 206. ETC 204 processes signaling data and routes traffic data exchanged between subscriber units and MSC 206. The principle functions of ETC 204 include managing radio channels and transferring signaling information to and from subscriber units. When call handling signaling do not directly affect ETC 204, it serves as a relay point between a subscriber unit and MSC 206.

Operations maintenance control for a gateway (OMCG) 208 provides the gateway with functions such as configuration, diagnostics, fault isolation, and maintenance. It also provides an interface between the gateway and SCS 28 (FIG. 1).

MSC 206 is preferably similar a telephone switching office for mobile originated and mobile terminated calls. MSC 206 provides an interface to a PSTN, and to the terrestrial circuits of ETC 204. MSC 206 communicates and passes signaling and traffic data to ETC 204 which provides for remote switching, distributed control, and traffic concentration. MSC 206 also provides call control functions such as number translations and routing, matrix path control, and allocation of outgoing trunks. MSC 206 desirably collects call billing data, formats the data into records, and sends these records to a billing center. MSC 206 may also collect traffic statistics for performance and management purposes.

Home location register (HLR) 210 is a data base which manages subscriber unit data and keeps track of a subscriber unit's location as it roams around the earth. HLR 210 is a reference data base for subscriber unit parameters. Various identification numbers and addresses are stored within HLR 210, as well as authentication parameters, services subscribed, and special routing information. Current subscriber unit status is also preferably maintained, including a subscriber unit's temporary roaming number and associated visitor location register (VLR) 212 when roaming. This data may be remotely accessed by the MSCs and VLRs. HLR 210 desirably includes an authentication center which is responsible for protecting against fraudulent system use.

VLR 212 is a data base which preferably contains a copy of most of the data stored at HLR 210. This data is a temporary entry which exists only as long as a particular subscriber unit is known to be operating within the area served by VLR 212. VLR 212 provides a local data base for a subscriber unit which eliminates unnecessary interrogations of HLR 210. VLR 212 may contain some duplicate HLR data as well as more precise location information and status. VLR 212 manages subscriber unit data and keeps track of the location of subscriber units.

Gateway switching center (GSC) 214 provides switching functions for gateway 22. GSC 214 may use GSM (Global System for Mobile communications) system elements which desirably include the following network elements: MSC 206, HLR 210, VLR 212, and an equipment identity register (not shown).

In a preferred embodiment of the present invention, a subscriber unit accesses another subscriber unit by dialing the called user's mobile subscriber unit directory number or mobile subscriber unit integrated services directory number (MSISDN), which uniquely identifies one, and only one subscriber unit. When a subscriber unit accesses a telephone set in a local exchange through MXU 13, the subscriber unit dials the number of the telephone set in the local exchange without dialing the MXU associated with the local exchange. There is no concern, from the calling subscriber unit's point of view which radio channel between the MXU and communication system 10 is used for communication. In the preferred embodiment, each MXU 13 is capable of supporting up to 100 radio channels into communication system 10 (FIG. 1). However, those of skill in the art will understand that more or less radio channels may be also be supported. MXU 13 provides the radio channel access into communication system 10 (FIG. 1).

The association of many users to a few radio channels poses a difficulty when attempting to access a PSTN user on the land side of an MXU from a subscriber unit. For this access to take place, the subscriber unit has no knowledge of which of the MXU circuits is available to form the connection. The gateway serving the calling party cannot associate the called number with an available MXU radio channel units. Thus, a single point of access for call control signaling (i.e. MXU 13) is desirably associated with all the radio channels of MXU 13.

Referring to FIG. 4, one purpose of MXU 13 is to provide a voice connection between a satellite communication network and public or private networks in areas that cannot support a full gateway. Examples that may not be able to support a gateway include locations that have poor infrastructure, lack of an international switching center (ISC) interconnection, and financial considerations.

To perform this function, MXU 13 may use either a public or private network (i.e., a local exchange or Private Branch Exchange (PBX)) to concentrate a large number of lines into a small number of shared lines to MXU 13. A PBX is an automatic telephone office serving a private customer, such as a business, school, etc. MXU 13 connects these shared lines to an outside communication network. In the preferred embodiment, MXU 13 connects these shared lines to a global satellite communication system such as system 10 (FIG. 1) over link 16 (FIG. 1).

MXU 13 is preferably deployed adjacent to an isolated network, and desirably accesses that network by standard telephony interfaces, such as a signaling system seven (SS7), or others. SS7 is a group of telephony signaling protocols which enables cooperative inter-working between network switching system machines within one or several networks. MXU 13 preferably provides access to cellular systems using the standard procedures of that cellular system, augmented by the procedures described herein.

The present invention is applicable to many communication systems, including those which use the GSM procedures for subscriber unit control and network behavior, but may have different radio access formats. For the purposes of this description, at least one and preferably several subscriber units are desirably embodied in MXU 13. For a given subscriber unit, the HLR in which its subscriber unit data resides is referred to as the subscriber unit's home gateway (HGW). The VLR in which a subscriber unit is registered is referred to as the subscriber unit's visiting gateway (VGW). A VGW is a gateway that a roaming subscriber unit is currently being serviced by. When supporting an MXU, the HGW and VGW are identical, so the term gateway is used to mean either and both hereafter. The gateways (in particular the MSC, HLR, and VLR elements) are interconnected to support signaling among them, preferably as described in GSM standards.

Gateway 22 performs procedures which are beyond its traditional role in a communication system including translating the phone number of a telephone set in communication network 97 attached to MXU 13 (FIG. 4) and allocating a subscriber unit identity associated with MXU 13 for call, processing. Gateway 22 also processes the MXU's radio access as though it were an ordinary subscriber unit. Gateway 22 also relays the phone number of the telephone set in network 97 to MXU 13.

For the purpose of this description, in the preferred embodiment, the functions described above are allocated primarily to ETC 204. However, these functions may be allocated to HLR 210, MSC 206, or some combination thereof, without changing the nature of the invention. These variations are intended to be included within the scope of the invention. In another embodiment, a dedicated channel between MXU 13 and it's associated gateway is used to allocate the terminating subscriber unit identity at the MXU.

The MXU telephony signaling implementation separates the satellite-link equipment within the MXU from the associated logical channel assignment (i.e. temporary mobile subscriber identifications (TMSIs)). Where MXU 13 supports up to "n" L-band user traffic channels, "2n" pairs of international mobile subscriber identifiers (IMSI) and MSISDNs (IMSI/MSISDN pairs) are assigned to the MXU. Each IMSI preferably uniquely identifies a subscriber unit, and is desirably installed in the MXU at time of service subscription by the service provider.

In a preferred embodiment, each MXU is under the management of a serving gateway. An MXU is preferably stationary throughout its service life at a particular location (i.e., set up at a particular location until it is no longer needed, then moved to a new location). For a stationary MXU, its serving gateway and its home gateway are preferably one in the same.

Prior to an MXU being brought on-line, an MXU is initialized by assigning it 2n IMSI/MSISDN pairs by the gateway administrator. Preferably, all of the IMSI/MSISDN pairs are allocated to the MXU, and half are allocated to the ETC. A gateway administrator preferably loads the IMSI/MSISDN pairs into the HLR by the OMCG. The IMSI/MSISDNs allocated to the ETC are also loaded into the ETC by the OMCG. In the event of an ETC reset, these IMSI/MSISDN pairs are desirably re-loaded into the ETC.

The MXU contains all 2n IMSIs. In a preferred embodiment, each of the IMSIs are required to register with the HGW, and are assigned an associated TMSI. Subscriber unit registration process requires the MXU to perform the registration process for each of the IMSIs. Because the MXU is preferably stationary throughout its service life at a particular location, the TMSIs preferably only change at the request of the system (i.e., periodic updates or VLR resets).

Figure 6:
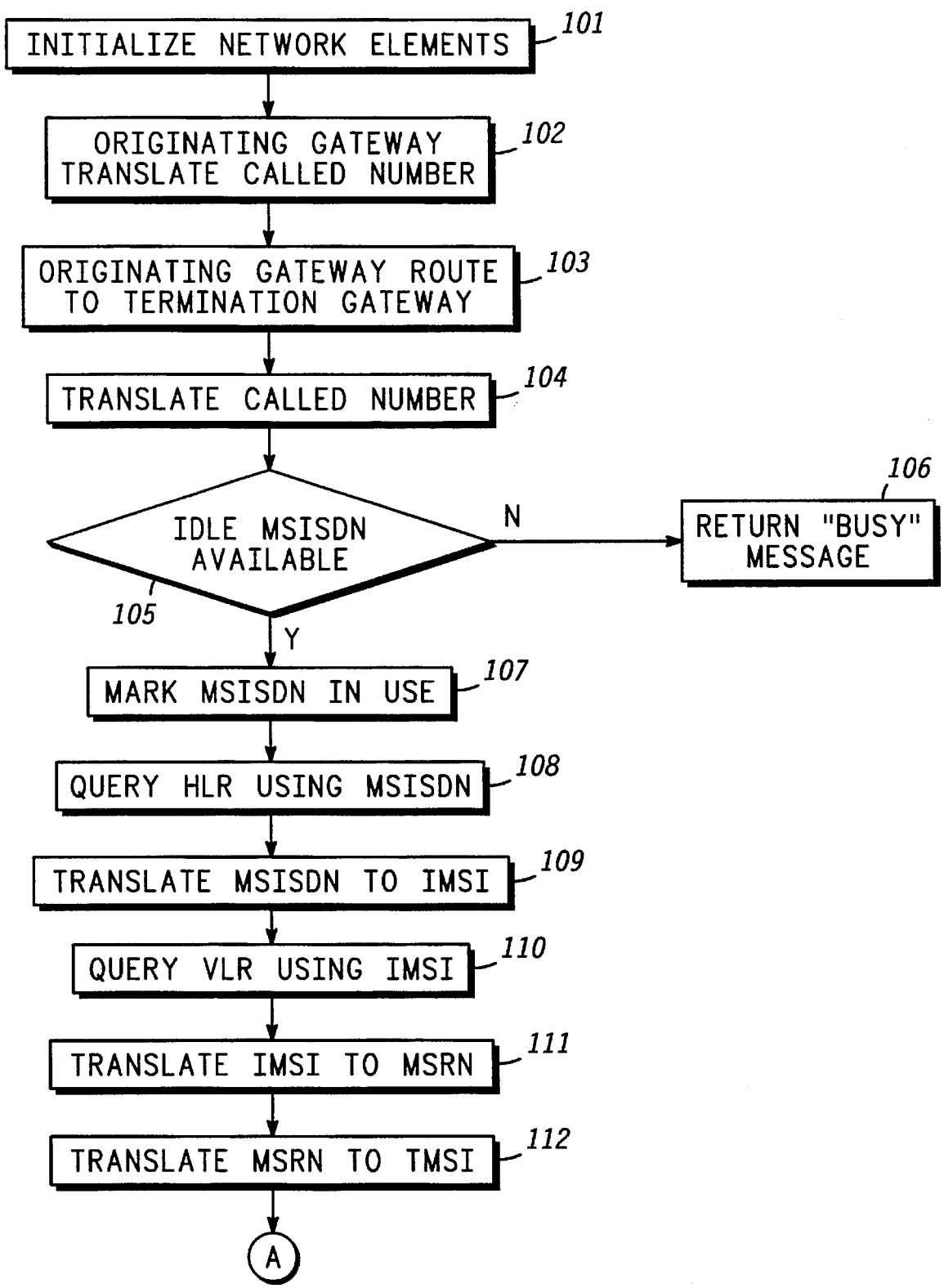
FIG. 6 and FIG. 7 show a flow chart of a call setup procedure suitable for use in a preferred embodiment of the present invention.
Figure 7:
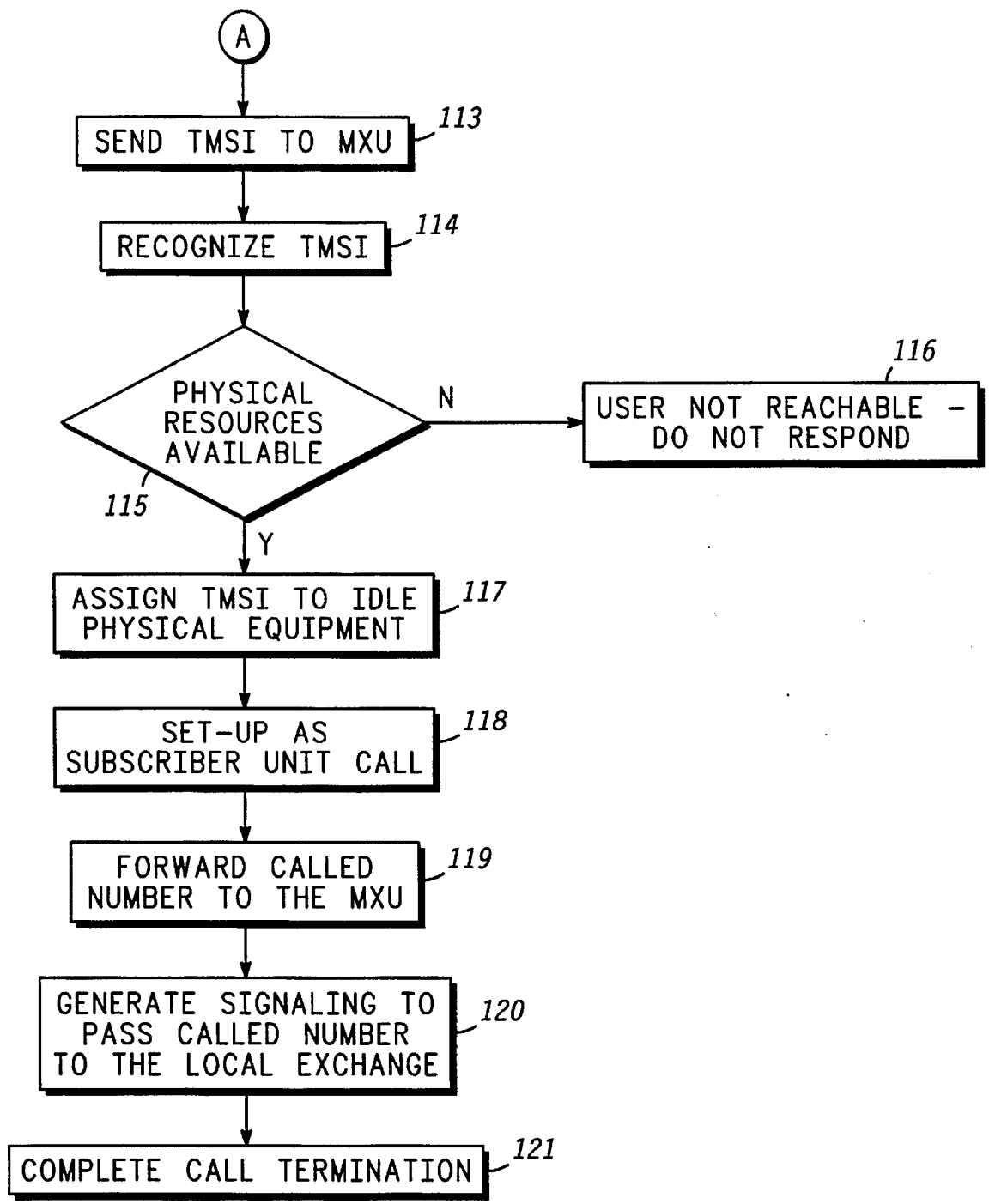

The functions performed by each element when processing a call termination are discussed below and with regard to procedure 100 (FIGS. 6 and 7). In a subscriber unit to subscriber unit call of a preferred embodiment, the calling GW queries the called GW's HLR for the status and mobile station roaming number (MSRN) of the called party. The MSRN is code temporarily allocated to a subscriber unit, when registered at a VLR, for routing calls to the subscriber unit. The MSRN is typically assigned by the VLR only during call termination.

In the MXU case, a subscriber unit in an outside communication system calls a party at a local exchange connected by an MXU. Preferably, similar signaling procedures associate an HLR query with one of the radio channels of the MXU that is available, and returns this information to the calling GW. The calling GW uses this information to initiate a call to the called GW using the MSRN. In another embodiment, the calling GW routes the call to the called GW, then queries the HLR for the MSRN. The called GW uses the MSRN to determine a temporary ID such as a temporary mobile subscriber identification (TMSI) of the called party. The called GW proceeds with call setup to the subscriber unit specified by the temporary ID. A TMSI is a unique identity temporarily allocated to visiting subscriber units. The TMSI is preferably a subscriber unit's network address in the communication system and is preferably assigned by the VLR at registration.

The ETC within the MXU's GW intercepts the HLR query containing the called number. The ETC reformats this message into a reformatted HLR query substituting for the called number an idle MSISDN. The idle MSISDN is selected from internal IMSI/MSISDN tables. The reformatted HLR query is sent to the HLR within the MXU's HGW. The HLR returns the associated MSRN of the called (and reserved) MSISDN. The called GW proceeds with the call setup as though the call is a subscriber unit to subscriber unit call. Channel allocation is carried out by the MXU upon receipt of the TMSI associated with the MSRN.

The following describes MXU call termination and assumes a 100 channel MXU of a preferred embodiment of the present invention. During the ETC/MXU registration process, the MSC has allocated 200 TMSIs to the associated IMSI/MSISDN pairs within the HGW ETC and MXU. The HGW ETC maintains a table of the 100 IMSI/MSISDNs which are reserved for call termination's to the MXU. The HGW ETC is desirably also capable of associating the incoming called number with one of these IMSIs. Each HGW ETC which services more than one MXU determines the appropriate MXU by analyzing the called number. For incoming calls (to the MXU), the HGW ETC chooses an idle IMSI from its list of available IMSIs for signaling to the MXU. The MXU recognizes all TMSIs associated with these IMSIs/MSISDNs, and assign resources (i.e., a radio channel) to the logical TMSI being used.

Each ETC is desirably assigned a Point Code (PC) which uniquely identifies that ETC within the network. The PC is preferably different than the PC assigned to the GSC which contains the ETC.

The translation at the originating GW MSC of a called number yields an Initial Address Message (IAM) to the MXU's HGW as in a normal call termination. IAM is a message conveying a call offering to a destination exchange. The HGW MSC translates the called number within IAM, and identifies the called party as a subscriber unit. This called number within the IAM is preferably the address of a PSTN user which is located behind an MXU.

Global title translation of the called number at the HGW MSC yields a point code associated with the HGW ETC. The HGW MSC launches a "Send Routing Info" request to the HGW ETC containing the called number.

The HLR for the called number is simulated in the ETC of the MXU's HGW. When the ETC supports multiple MXUs, the ETC desirably translates the called number to determine which of its MXUs can handle the call. The ETC chooses an idle IMSI/MSISDN from its IMSI/MSISDN table, marks that entry as "busy", associates the called number with that entry, and initiates a call setup using that IMSI/MSISDN. A HLR query is sent from the ETC to the HLR using the reserved MSISDN. The HLR translates the MSISDN to a MSRN (by a query to the VLR), and returns the MSRN to the MSC. The MSC translates the MSRN to a TMSI, and signals the MXU using this TMSI. When the terminating MXU recognizes the TMSI, it assigns a radio channel transceiver to the TMSI.

Following connection establishment with the network, the MXU preferably responds to the ETC's signaling message with a signal response. In a preferred embodiment, the MXU may respond to an ETC's ring alert indication message with a paging response. The ETC transfers the called number to the MXU in an "MXU called number" message. The MXU establishes a connection to its local exchange interface using this called number. Signaling and supervision messages with the local exchange are translated to messaging for the specific communication system. Call setup continues as a subscriber unit terminated call.

For MXU call origination, the local exchange user first accesses the MXU with a called number. Once a local exchange user obtains access to the MXU, the called number is signaled into communication system 10 (FIG. 1) as though it was entered on a subscriber unit keypad.

As discussed previously, the MXU maintains a table of IMSI/MSISDNs which are reserved for calls originating from the MXU. For outgoing calls (i.e., from an MXU), the MXU chooses an idle IMSI from its list of available IMSIs for signaling to the gateway. The MXU assigns a radio channel to the IMSI for calls originating from the MXU. These calls originating within the MXU appear to communication system 10 (FIG. 1) as subscriber unit originated calls.

FIG. 6 and FIG. 7 show a flow chart of a call setup procedure suitable for use in a preferred embodiment of the present invention. This MXU signaling implementation is based on a separation of the radio channel equipment within the MXU from associated logical channel assignment (i.e. TMSIs). Both the MXU and ETC maintains a unique list IMSIs/MSISDNs.

For incoming calls (to the MXU), the ETC chooses an idle IMSI from its list of available IMSIs for signaling to the MXU. The MXU recognizes all TMSIs associated with these IMSIs/MSISDNs, and assigns L-band resources to the logical TMSI being used. For outgoing calls (from the MXU), the MXU does the same from its list of IMSIs.

In referring to FIG. 6, task 101, the MXU is assigned 2n IMSI/MSISDN pairs (assuming an n channel MXU) by a gateway administrator prior to an MXU being brought on-line. All of these IMSI/MSISDN pairs are allocated to the MXU. Half are also allocated to the ETC. The gateway administrator desirably loads these IMSI/MSISDN pairs into the HLR. The IMSI/MSISDNs allocated to the ETC are also desirably loaded into the ETC. The MXU is required to register each of these IMSIs with the VLR, and is assigned an associated TMSI for each one.

In task 102, the originating GW MSC receives the called number, which is that of a telephone set in the network attached to the MXU. It translates this number to determine the termination point of the call.

In task 103, the translation of the called number by the originating GW MSC yields a call offering (preferably implemented as an SS7 subscriber unit initial address message, (IAM)) to the Gateway supporting the MXU, as in a normal subscriber unit to PSTN call. The call is routed to the MSC.

In task 104, the MSC translates the called number within the IAM. This shows that the call should be treated as though the number were that of an ordinary mobile subscriber unit. A global title translation of the called number at the MSC yields a point code associated with the ETC. The MSC launches a "Send Routing Info" (SRI) request to that point code, containing the called number. An SRI is a message query to the HLR to yield a MSRN for the specified mobile user. Note that the destination is usually an HLR because the ETC acts as an HLR for those numbers "behind" the MXU.

In task 105, the ETC receives the SRI query, and checks its table of IMSI/MSISDNs for an idle entry. When an idle entry can be found, task 107 is executed. When an idle entry cannot be found, task 106 is executed.

In task 106, the ETC returns a SRI failure message to the MSC when an idle entry cannot be found. Lack of an idle entry represents that all circuits are busy to the MXU.

Task 107 is executed when an idle entry is available. In task 107, the ETC marks the entry as busy, associates the called number with this entry, and uses the MSISDN of this entry to query the HLR.

In task 108, the ETC queries the HLR using the MSISDN. This is accomplished by sending a "Send Routing Info" request to the HLR containing the MSISDN. In task 109, the HLR indexes its internal tables using the MSISDN to translate the MSISDN to an IMSI. In task 110, the HLR uses the IMSI to query the VLR by a "Provide Roaming Number" message.

In task 111, the VLR translates the IMSI to a MSRN, and returns this to the HLR. The HLR forwards the MSRN to the ETC (the source of the query from the HLR's perspective), which in turn sends it to the MSC. The ETC has no use for the MSRN, but stays in the loop to ensure that transaction identifiers are handled properly according to the GSM standards.

In task 112, the MSC translates the MSRN to a TMSI by a query to the VLR. Referring to FIG. 7, in task 113, the MSC then sends a "Paging" message to the ETC. This message contains the IMSI and associated TMSI. The ETC forwards this indication to the MXU according to the radio procedures appropriate to the particular cellular system being used.

In task 114, the MXU monitors the appropriate radio channels for any TMSI assigned to the MXU. The MXU desirably compares the received TMSI with its internal list of TMSIs. The MXU desirably recognizes this message as destined for it when it contains a valid TMSI. The MXU preferably acknowledges this TMSI as being associated with this MXU. In task 115, the MXU checks when physical resources are available. When they are, task 117 is executed. If not, task 116 is executed.

In task 116, the MXU does not respond to the TMSI when physical resources are not available. This causes the MSC to time out waiting for a response. Upon timing out, the MSC begins call treatment for "user not reachable" and activates the appropriate services as subscribed by the MXU administrator. These services may include an announcement to the call originator (caller not reachable), or the call may be forwarded to another number.

In task 117, the MXU assigns the TMSI to a radio transceiver. In task 118, the radio transceiver continues call setup as a normal subscriber unit terminated call. The radio transceiver is preferably functionally equivalent to a mobile station of the cellular system being used. In task 119, the ETC forwards the called number associated with the call to the MXU. The called number addresses a set in the network attached to the MXU, rather than the MXU itself.

In task 120, the MXU generates the appropriate signaling to the exchange to pass the called number to the exchange. The MXU therefore allows the exchange to make the connection to the called party specified by the called number. In task 121, the MXU completes the call termination processing as a mobile terminated call.

While the invention has been described in terms of specific examples and with specific preferred embodiment, it is evident that many alternatives and variations will be apparent to those skilled in the art based on the description herein, and is intended to include such variations and alternatives in the claims.

As described herein, the advantages of the present invention will be apparent to those of skill in the art and provide improved methods of operating various parts of a communication system. These advantages include relating one called number to many possible destinations, improved access to isolated communication networks and simplified access procedures.

What is claimed is:

1. A method of providing an interface between a communication system and a local exchange, said interface including a mobile exchange unit (MXU), said method comprising the steps of:

(a) translating a called number to identify a user associated with said local exchange;

(b) requesting routing information to a destination gateway (DGW), said DGW being associated with said MXU;

(c) choosing by said DGW, an identifier for said called number, said identifier identifying a radio channel coupling said MXU with said communication system;

(d) signaling said MXU by identifying said user associated with said local exchange;

(e) assigning said radio channel; and (f) establishing a connection to said local exchange using said called number, wherein step (a) further comprises the steps of:

(a1) translating said called number at an originating gateway mobile switching center (OGMSC) to arrive at an initial address message (IAM), said IAM identifying said called number as said user associated with said DGW;

(a2) translating said called number by said OGMSC to yield a first point code which identifies said DGW;

(a3) sending said IAM to a mobile switching center (MSC) associated with said DGW;

(a4) identifying by said MSC said called number as being associated with said local exchange by using said IAM; and (a5) translating said called number by said MSC to yield a second point code which identifies an earth terminal controller (ETC) associated with said local exchange.

2. A method as claimed in claim 1 wherein step (e) further comprises the step of transferring said called number from said ETC to said MXU.

3. A method as claimed in claim 1 wherein step (b) comprises the step of launching, by said OGMSC, a request for said routing information to said ETC.

4. A method as claimed in claim 3 wherein step (c) comprises the steps of:

(c1) choosing said identifier from a table in the ETC, said identifier being associated with said called number, said identifier comprising a mobile services directory number (MSDN) for said called number and a radio channel identifier identifying said radio channel, said radio channel being one of a plurality of radio channels coupling said MXU with said communication system; and (c2) marking said identifier as busy in said table.

5. A method as claimed in claim 4 wherein step (c1) includes choosing an international mobile subscriber identifier (IMSI) and a mobile station integrated services directory number (MSISDN), wherein said identifier comprises an IMSI/MSISDN pair, said IMSI uniquely identifying a subscriber, and installed at service subscription by a service provider.

6. A method as claimed in claim 4 wherein step (c) further comprises the steps of:

(c1) sending a query from said ETC to a home location register (HLR) for said called number, said query containing said MSDN, said HLR being part of said DGW;

(c3) translating said MSDN by said HLR, to a temporary code;

(c4) sending said temporary code to said MSC; and (c5) translating said temporary code, by said MSC to a temporary ID.

7. A method as claimed in claim 6 wherein step (c3) includes the step of translating said MSDN to a mobile subscriber roaming number (MSRN), and wherein step (c5) includes the step of translating said MSRN to a temporary mobile subscriber identification (TMSI).

8. A method as claimed in claim 6 wherein step (d) further comprises the steps of:

(d1) paging said MXU with said temporary ID; and (d2) recognizing said temporary ID by said MXU as identifying a called party associated with said local exchange.

9. A method as claimed in claim 1 wherein steps (e) and (f) are performed by said MXU, and the method further comprises the step of assigning signaling numbers to said MXU which correspond to a plurality of radio channels coupling said MXU with said communication system, said radio channel being one of said plurality of radio channels, said signaling numbers being stored in said earth terminal controller.

10. A method of providing an interface between a communication system and a local exchange comprising the steps of:

(a) requesting routing information for a communication path between a subscriber unit in said communication system and a destination in said local exchange;

(b) reserving a radio channel for said communication path, said radio channel coupling said interface to said communication system;

(c) sending said routing information and a radio channel identifier to an originating gateway, said radio channel identifier identifying said radio channel; and (d) proceeding with setup procedures between said originating gateway and said interface using said radio channel identifier and said routing information wherein step (a) includes the step of requesting routing information to said destination in said local exchange (e) receiving a request to setup said communication path between said subscriber unit and said destination, said request being received at said originating gateway;

(f) sending a query from said originating gateway containing a called number, said query requesting said routing information;

(g) intercepting said query by a called gateway, said called gateway being associated with said MXU;

(h) sending said query from said called gateway to said MXU (i) sending in response to said query, from said MXU to said called gateway, an identifier specifying said destination and said radio channel; and (j) sending from said called gateway to said originating gateway, a message including said radio channel identifier and said routing information.

11. A method as claimed in claim 10 wherein step (g) comprises the step of sending a mobile subscriber directory number to said called gateway.

12. A method as claimed in claim 10 wherein step (a) includes the step of requesting routing information between said subscriber unit and said destination, wherein said communication system is a global communication system comprising orbiting communication nodes, and said local exchange has limited access to outside communication networks.

13. A method as claimed in claim 10, wherein said interface includes a mobile exchange unit (MXU) that couples said communication system with said local exchange, and said method further comprises the step of:
assigning signaling numbers to said MXU which correspond to a plurality of radio channels coupling said MXU with said communication system, said radio channel being one of said plurality of radio channels, and
wherein step (d) further comprises the steps of:
proceeding with setup procedures using one of said signaling numbers associated with said radio channel; and
establishing said communication path between said subscriber unit and said destination.

14. A method as claimed in claim 10 further comprising the step of translating a called number at said originating gateway to determine said destination of said called number, said called number being received from said subscriber unit.

15. A method of connecting a subscriber unit in a communication system with a destination in a local exchange, said method comprising the steps of:
(a) assigning signaling numbers to a mobile exchange unit (MXU), said signaling numbers corresponding to radio channels coupling said MXU with said communication system, said MXU providing an interface between said local exchange and said communication system;
(b) receiving a called number at an originating gateway, said called number being associated with said destination;
(c) sending a request for routing information to a destination gateway which supports said MXU, said request containing said called number;
(d) reserving an idle channel coupling said MXU and said communication system;
(e) associating said idle channel with said called number;
(f) sending a radio channel identifier which identifies said idle channel from said destination gateway to said MXU;
(g) assigning at said MXU said radio channel identifier to an available transceiver of said MXU;
(h) forwarding from said destination gateway, said called number to said MXU;
(i) proceeding with call setup procedures between said originating gateway and said destination gateway using said radio channel identifier as a subscriber identification
(j) providing said called number to said local exchange to allow said local exchange to connect a called party at said destination to said idle channel through said MXU; and
(k) translating said called number at said originating gateway to determine said destination of said called number.

16. A global communication system that interfaces with a local exchange comprising:
a mobile exchange unit (MXU) interfaced with said local exchange, said MXU associating a plurality of subscribers in said local exchange with single communication channels between said MXU and a satellite communication node;
a destination gateway (DGW) associated with said MXU; and
an originating gateway for translating a called number to identify a user associated with said local exchange, and requesting routing information to said DGW,
wherein said DGW chooses an identifier for said called number, said identifier identifying a radio channel coupling said MXU with said communication system, and signals said MXU by identifying said user associated with said local exchange,
wherein said MXU assigns said radio channel, and establishes a connection to said local exchange using said called number,
wherein said originating gateway is associated with an originating gateway mobile switching center (OGMSC) for translating said called number to arrive at an initial address message (IAM), said IAM identifying said called number as said user associated with said DGW, for translating said called number to yield a first point code which identifies said DGW, and for sending said IAM to a mobile switching center (MSC) associated with said DGW,
wherein said MSC identifies said called number as being associated with said local exchange by using said IAM, and translates said called number to yield a second point code which identifies an earth terminal controller (ETC) associated with said local exchange.

17. A global communication system as claimed in claim 16 wherein said satellite communication node is coupled between said destination gateway and said MXU, establishing a communication path from said destination gateway thorough said MXU to said local exchange.

18. A global communication system that establishes a communication path to a called number in a local exchange comprising:
an originating gateway;
a first satellite communication node coupled to said originating gateway;
a destination gateway;
a second satellite communication node coupled between said destination gateway and said first satellite communication node;
a mobile exchange unit (MXU) coupled between said second satellite communication node and a local exchange, said MXU supporting a plurality of subscribers with single communication channels;
wherein said originating gateway is associated with an originating gateway mobile switching center (OGMSC) and said destination gateway is associated with a destination gateway mobile switching center (DGMSC),
wherein said communication path includes said first satellite communication node, said second satellite communication node and said MXU,
wherein said OGMSC for translating said called number to arrive at an initial address message (IAM) identifying said called number as being associated with said destination gateway, and for sending said IAM to said DGMSC;
said DGMSC for identifying said called number as being associated with said local exchange by using said IAM and identifying one of a plurality of subscribers associated with said local exchange based on said IAM,
said destination gateway causing said second satellite node to page said MXU with a temporary ID that identifies said one subscriber, said MXU recognizing said one subscriber and responding to said page, said DGMSC reserving a radio channel between said MXU and said second satellite communication node after said MXU responds to said page, said DGMSC requesting routing information from said OGMSC to said destination gateway, said OGMSC providing said routing information to said DGMSC to establish said communication path to said local exchange.

* * * * *